July 2, 1940.  O. W. PINEO  2,206,576

MAGNETOSTRICTIVE DEVICE FOR LIGHT VALVES

Filed Sept. 22, 1938

INVENTOR.
ORRIN W. PINEO,
BY Robert Ames Norton
ATTORNEY.

Patented July 2, 1940

2,206,576

UNITED STATES PATENT OFFICE 2,206,576

MAGNETOSTRICTIVE DEVICE FOR LIGHT VALVES

Orrin Weston Pineo, Milo, Maine, assignor, by mesne assignments, to American Cyanamid Company, New York, N. Y., a corporation of Maine Application September 22, 1938, Serial No. 231,228

4 Claims. (Cl. 88—61)

This invention relates to magnetostrictive devices and more particularly to light valves actuated by said devices.

In my prior patent No. 2,126,410 issued August 9, 1938, I have described various means for periodically varying the state of polarization of plane polarized beams without changing their intensity. One of these methods involves the rotation of a half-wave plate of material exhibiting birefringence which varies along different azimuths. The device requires rotation of the plate which involves rotating parts of considerable size. Another method involves variation of the birefringence of a medium such as nitrobenzene in a Kerr cell with varying voltages. The Kerr cell requires nitrobenzene of very high purity, and is not suitable for ultra-violet measurements because of its light absorption. It is also difficult to obtain uniform birefringence in a Kerr cell over an area large enough for satisfactory light transmission. The high voltages in the Kerr cell also produce electrical interference in high gain amplifiers.

According to the present invention a magnetostrictive device may be used to produce a light valve capable of changing the state of polarization of beams without changing their intensity by utilizing the phenomenon of forced birefringence. Many transparent materials such as glass, quartz, Bakelite, and the like become birefringent when stress is applied along one axis. If, therefore, the stress can be varied periodically, the birefringence is varied in the same manner and will produce a periodic variation in intensity of polarized beams of light. The present invention utilizes the phenomenon of magnetostriction to produce the periodic stress: motion due to the magnetostrictive action of a suitable material, placed in a solenoidal coil carrying an alternating current, being applied along one axis of the transparent material in which the birefringence is to be produced.

Preferably a constant average stress should be maintained, as by hydraulic pressure, and the periodic stress superposed thereon. This prevents large variations in aperiodic stresses due to thermal expansions and the like. A constant average stress is conveniently obtained by coupling, the elements moving through magnetostriction and the elements transmitting pressure to the birefringent material, through a hydraulic medium rigidly confined except for leakage to or from a reservoir through such restricted openings that the flow cannot adjust itself to periodic stresses of fairly high frequency but can adjust itself to variations in stress occurring slowly over a considerable period of time. The reservoir is conveniently maintained under a suitable pressure by a pneumatic pressure arising from volume reduction. A thin layer of liquid under pressure is thus interposed in the linkage transmitting movement from the magnetostrictive elements to the birefringent material and this liquid communicates with the reservoir through small passages.

The invention will be described in greater detail in conjunction with the following drawing in which Fig. 1 is an enlarged elevation, partly broken away in section, of the magnetostrictive device;

Figure 1:
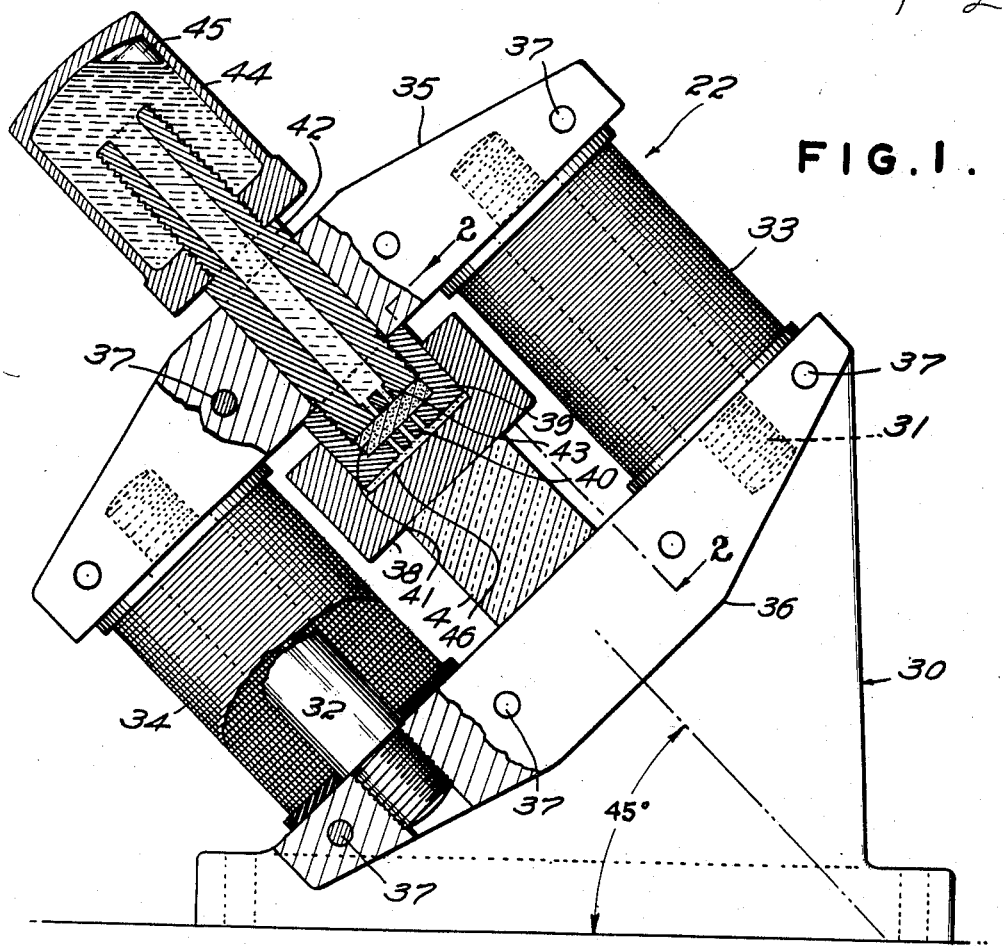
Figure 2:
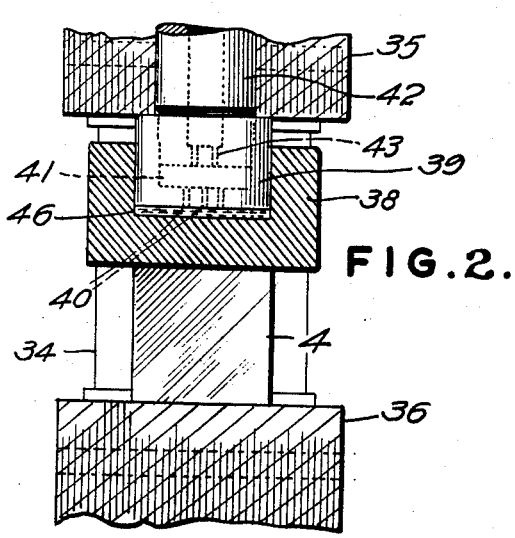
Fig. 2 is a section taken along the line 2—2 of Fig. 1.
Figure 3:
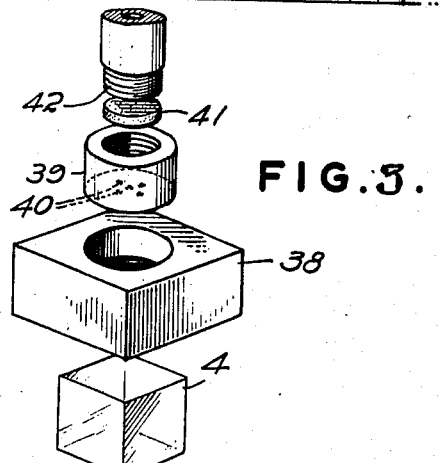
Fig. 3 is a detail of the elements of Fig. 2, separated to show their individual construction.

Figs. 1 and 3 show the magnetostrictive device of the present invention. It consists of a mounting frame 30 which positions the compression axis of the glass block 4 at an angle of 45° with the plane of the beams leaving the Wollaston prism. In the frame 30 are screwed magnetostrictive rods 31 and 32 surrounded by coils 33 and 34 which are fed with current through the wires 21. The opposite ends of the rods are screwed into an upper member or yoke 35. Preferably, this yoke and the connecting piece 36 connecting the other two ends of the rods are laminated to increase the magnetic efficiency of the device. Rigidity is obtained by clamping the laminations between two heavy steel plates by means of the bolts 37.

A cup 38 presses on the upper side of the glass block 4 and is connected to the yoke 35 through a hollow piston 39 of heavy metal and provided with holes 40 in its bottom. The piston 39 fits tightly in the cup 38 and is preferably provided with some kind of a seal such as a grease seal to produce a liquid-tight fit. A porcelain filter block 41 fits tightly into the piston 39 and is pressed tightly against the bottom of the piston by the hollow bolt 42 which screws into the piston 39 and is provided with holes 43 at the bottom end of the hollow central portion. A reservoir 44 is screwed onto the threaded upper portion of the bolt and is filled with oil or similar fluid nearly up to the top, leaving a moderately sized air space 45. Oil from the reservoir flows down through the hollow bolt 42, channels 43, porcelain filter 41, and holes 40 to form a thin oil layer 46 between the piston 39 and the cup 38.

In operation, the reservoir 44 is screwed down until a suitable pressure is built up on the fluid which is transmitted through the openings 43 and the fine capillaries of the porcelain filter block to the oil layer 46 and hence to the cup 38. This produces a steady hydraulic pressure on the glass block 4 and maintains a constant stress. This stress remains substantially constant in spite of small changes in the length of the rods 31 and 32 due, for example, to thermal expansion because the amount of movement of the piston 39 causes a volume increase or decrease in the oil layer 46 which is small compared to the volume of the air space 45. Such slow movements give oil time to flow through the porcelain filter and therefore the steady hydrostatic pressure remains substantially constant.

The degree of the pressure will vary somewhat with the nature of the birefringent material. For example, with glass as the material and rods of 70% cobalt, 30% iron alloy, the constant pressure should be about 250. lbs./sq. in. The periodic force should not exceed at maximum 250 lbs./in. width of the glass block, being independent of its length or thickness. The thickness of the glass block depends on the amount of compression which is about 0.02 mm. divided by the thickness in mm. for a 1" length. Magnetostriction produces an elongation at magnetic saturation of the alloy in question of $60 \times 10^{-6}$. With 2" rods, this elongation changes to 0.03 mm. and therefore in order to utilize the full variation produced by magnetostriction, the glass should be about 1 cm. thick.

The oil layer is preferably thin, 1 mm. or less, so that oil compression is not appreciable. The constant pressure of around 17 atmospheres is obtained by screwing up the oil reservoir until the air bubble has $1/17$ of its original volume.

When using alternating current of 60 cycles to supply the magnetostrictive device, the movements of the upper yoke and piston 39 are so fast that oil cannot flow through the capillaries of the porcelain filter block to compensate materially periodic movements of this frequency. The oil layer provides a practically rigid connection.

The above figures are given for glass and will vary to some extent with other materials, being about the same for quartz. Some Bakelite materials are fifty times as sensitive but have only $1/8$ the modulus of elasticity as possessed by glass and require about 2 mm. thickness instead of 1 cm. They need considerably less pressure in the oil reservoir. When the pressure in the oil reservoir is sufficiently high so that at maximum elongation of the rods the pressure on the glass block 4 becomes almost zero, the full effect of the magnetostrictive stress is obtained.

It will be apparent that the present invention produces a variation of birefringence which may be at the flicker frequency of a flickering beam spectrophotometer with non-moving parts except for the upper laminated yoke with its piston and cup. These parts are very sturdy and their movement is well lubricated and amounts to only a few microns. The device is therefore sturdy and any distortion which may take place is automatically taken up by the substantially constant pressure on the oil. A reliable and simple mechanism is thus obtained.

The invention has been described in conjunction with a magnetostrictive device and with provision for a constant pressure. The drawing sets forth a preferred modification of such device but it should be understood that equivalent constructions may be used. Thus, for example, the fluid connection may be any suitable liquid although for practical purposes, an oil is very satisfactory.

What I claim is:

1. A device for periodically varying the pressure on material by magnetostriction at relatively high frequency while maintaining pressure constant for variations of low frequency comprising in combination a plurality of solenoid coils with parallel axes, cores in said solenoid coils of magnetostrictive material, yokes connecting the ends of said cores, means for mounting the material on one yoke, means for transmitting pressure from the second yoke to the material comprising a chamber closed at one end which end is adapted to be placed in contact with the material, a piston fitting liquid tight in the open end of said chamber and connected rigidly to the second yoke, a liquid film between the end of the piston and the closed end of said chamber, a liquid reservoir mounted on the second yoke and containing liquid and gas, means for compressing the gas and liquid in the reservoir, conduits between said reservoir and the liquid film of cross section too small to permit liquid flow under pressure impulses at high frequency.

2. A light valve comprising in combination a plurality of solenoid coils with parallel axes, cores in said solenoid coils of magnetostrictive material, yokes connecting the ends of said coils, a block of transparent material exhibiting birefringence under pressure mounted on one of said yokes, means for transmitting pressure from the second yoke to the block comprising a chamber closed at one end which end is in contact with the block, a piston fitting liquid tight in the open end of said chamber and connected rigidly to the second yoke, a liquid film between the end of the piston and the closed end of said chamber, a liquid reservoir mounted on the second yoke and containing liquid and gas, means for compressing the gas and liquid in the reservoir, conduits between said reservoir and the liquid film of cross section too small to permit liquid flow under pressure impulses at high frequency.

3. A light valve according to claim 2 in which the yokes are laminated.

4. A magnetostrictive device according to claim 1 in which the yokes are laminated.

ORRIN WESTON PINEO.